United States Patent [19]
Roetker

[11] Patent Number: 5,518,018
[45] Date of Patent: May 21, 1996

[54] FUEL TANK VENTING CONTROL ASSEMBLY

[75] Inventor: John J. Roetker, Connersville, Ind.

[73] Assignee: Stant Manufacturing Inc., Connersville, Ind.

[21] Appl. No.: 337,802

[22] Filed: Nov. 14, 1994

[51] Int. Cl.$^6$ .................................... F16K 17/36
[52] U.S. Cl. .......................... 137/43; 137/493; 137/510; 137/587
[58] Field of Search ................ 137/43, 493, 510, 137/587

[56] References Cited

U.S. PATENT DOCUMENTS

| | | |
|---|---|---|
| 3,738,384 | 6/1973 | Hall . |
| 4,007,643 | 2/1977 | Matsushita . |
| 4,416,108 | 11/1983 | Ghandhi . |
| 4,498,493 | 2/1985 | Harris . |
| 4,694,847 | 9/1987 | Szlaga . |
| 4,735,226 | 4/1988 | Szlaga . |
| 4,760,858 | 8/1988 | Szlaga et al. . |
| 4,953,583 | 9/1990 | Szlaga . |
| 4,991,615 | 2/1991 | Szlaga et al. . |
| 5,028,244 | 7/1991 | Szlaga . |
| 5,065,782 | 11/1991 | Szlaga . |
| 5,234,013 | 8/1993 | Roetker et al. . |

Primary Examiner—Robert G. Nilson
Attorney, Agent, or Firm—Barnes & Thornburg

[57] ABSTRACT

A fuel vapor control valve is provided for controlling the flow of fuel vapor and liquid fuel through an aperture in a fuel tank. The fuel vapor control valve includes a housing mounted in the aperture. The housing is formed to include an inlet in fluid communication with the fuel tank and an outlet. A valve is movable in the housing between a blocking position blocking flow of fuel vapor between the inlet and the outlet and a venting position allowing flow of fuel vapor between the inlet and the outlet. The fuel vapor control valve also includes a spring for biasing the valve toward its blocking position and a mechanism for using fuel vapor from the fuel tank to move the valve toward its venting position. A ball is movably positioned in the venting control chamber to selectively interrupt the fluid communication between the inlet and the outlet.

44 Claims, 3 Drawing Sheets 5,518,018

FUEL TANK VENTING CONTROL ASSEMBLY

BACKGROUND AND SUMMARY OF THE INVENTION

The present invention relates to fuel system valves, and particularly to a tank venting control assembly for regulating the flow of fuel vapor and air through a venting outlet provided in a fuel tank having a separate filler neck. More particularly, the present invention relates to a vehicle fuel vapor control valve which performs pressure-relief and vacuum-relief functions and also maintains a predetermined head pressure in the fuel tank during stationary refueling while relieving some fuel vapor pressure in the fuel tank when the vehicle is in motion.

Vehicle fuel systems are known to include tank pressure control valves configured to provide tank pressure relief and tank vacuum relief and to mount on either fuel tanks or filler necks. See, for example, U.S. Pat. No. 5,234,013 to Roetker et al., U.S. Pat. No. 4,498,493 to Harris, and U.S. Pat. Nos. 4,953,583 and 5,065,782 to Szlaga.

Although fuel pump nozzles are known to include sensor means for shutting off the flow of fuel from the nozzle when the fuel tank is nearly filled, it has been observed that users frequently manually override or bypass such fill-limiting sensors by continuing to pump fuel after the pump nozzle has automatically shut off several times. It will be appreciated that such unauthorized refueling practices can result in overfilling the fuel tank which can effectively reduce the fuel vapor expansion capacity available within the filled fuel tank.

It is also known to provide fuel vapor control valves for regulating tank pressure to prevent overfilling of the fuel tank during refueling. See, for example, U.S. Pat. No. 4,760,858 to Szlaga. Such a fuel vapor control valve includes a movable head valve for maintaining a head pressure within the fuel tank which exceeds the maximum head pressure that can develop in the filler neck due to filling the filler neck with fuel during refueling. Such a fuel vapor control valve aids in preventing fuel pump operators from overfilling fuel tanks by providing a pressurized fuel vapor barrier within the fuel tank that acts to block the introduction of liquid fuel into the fuel tank in excess of a predetermined fuel capacity during refueling. Such a fuel vapor control valve is adapted to vibrate to allow the release of fuel vapor during vehicle transit to increase the flow of fuel vapor to a fuel vapor treatment site and/or the atmosphere, thereby enhancing engine performance.

What is needed is a fuel vapor control valve for preventing tank overfilling during refueling and for relieving vacuum conditions that develop in a tank. Consumers would welcome a fuel vapor control valve that was also operable to vent minimal or residual tank pressure during motion of a vehicle carrying the tank and/or excessive tank pressure whether the vehicle is in motion or stationary.

According to the present invention an apparatus is provided for controlling venting of fuel vapor through an aperture in a fuel tank. The apparatus comprises a housing mounted in the aperture and a valve moveable in the housing. The housing is formed to include an outlet and defines a vent path for fuel vapor between the fuel tank and the outlet. The valve is moveable in the housing between the blocking position blocking flow of fuel vapor between the fuel tank and the outlet along the vent path and a venting position allowing flow of fuel vapor between the fuel tank and the outlet along the vent path. A spring biases the valve toward its blocking position.

The apparatus also comprises means for using fuel vapor from the fuel tank to move the valve against the spring towards its venting position. The using means includes a venting control chamber receiving fuel vapor from the fuel tank and a conduit communicating fuel vapor from the fuel tank to the venting control chamber. A ball is movably positioned in the venting control chamber to selectively interrupt the flow of fuel vapor through the conduit. The conduit has a first portion and a second portion moveable relative to the first portion to define an intermediate portion.

The apparatus further comprises a flexible partition extending between the valve and the first portion of the conduit to provide a barrier to prevent fuel vapor venting through the vent path from entering the intermediate portion. The flexible partition is deformable to maintain the barrier when the valve moves away from its blocking position towards its venting position.

In preferred embodiments, the using means includes a valve actuator for using fuel vapor from the fuel tank to urge the valve toward its venting position. The valve actuator includes a diaphragm covering the venting control chamber, and the diaphragm has an edge arranged to define an aperture. The conduit includes a stem appended to the edge of the diaphragm and arranged to define a flow channel so that the venting control chamber is in fluid communication with the flow channel through the aperture.

The ball is movably contained by a cage appended to the diaphragm and is positioned to interrupt the flow of fuel vapor through the conduit by sealingly engaging the edge of the diaphragm. The ball has a predetermined weight sufficient to interrupt the flow of fuel vapor through the aperture of the diaphragm so long as the vehicle remains substantially stationary and the tank pressure does not exceed a predetermined pressure set-point.

In use, the pressure-relief valve operates to vent excessive tank pressure to a fuel vapor treatment canister or other destination through the venting outlet formed in the housing. The pressure-relief valve operates to provide three levels of pressure relief depending upon the pressure of the fuel vapor in the fuel tank and whether the vehicle is stationary or in motion.

At the lowest level of pressure relief, the ball-type head valve operates during motion of a vehicle carrying the fuel tank to vent residual tank pressure to the canister even though tank pressure does not exceed the level required to activate the pressure-relief valve. This residual pressure is normally the pressure that is left in the tank after refueling.

During refueling, the ball-type head valve closes the venting outlet to cause a pressurized fuel vapor barrier to develop within the fuel tank. This barrier acts to block the introduction of liquid fuel into the fuel tank through the filler neck once the fuel tank is filled to its rated capacity. However, once refueling is completed and this barrier is no longer needed the ball-type head valve moves in response to vehicle movement to cause a vent passage in the housing chamber to open and vent some of the residual tank pressure through the venting outlet to the canister.

Advantageously, the ball normally resides in a sealing position on a conic surface having a pressure signal supply orifice in its trough. The ball seeks this sealing position when the valve is stationary. By plugging the orifice to halt the pressure signal to the top of the diaphragm, the valve moves to the blocking position. Once the valve is in the blocking position, the flow of fuel vapor between the fuel tank and the outlet ceases permitting a controlled fill of the fuel system and a full level shut off using a float valve or stand pipe controlled vent. The valve resumes normal ventilation when the assembly is accelerated agitating the ball and moving the ball from its seat thereby allowing the pressure signal to open the valve.

At the intermediate level of pressure relief, the ball-type head valve moves in response to vehicle movement to cause a vent passageway in the housing to open. The open passageway allows fuel vapor to accumulate and if the tank pressure is above a first predetermined pressure set-point, the fuel vapor will activate the valve actuator. Once activated, the valve actuator will move the valve to the venting position allowing the flow of fuel vapor from the fuel tank to the outlet along the vent path.

At the highest level of pressure relief when the vehicle is stationary, the ball-type head valve initially interrupts the flow of fuel vapor. The passageway will remain closed until the fuel vapor pressure in the fuel tank reaches a second predetermined pressure set-point at which the fuel vapor will unseat the sealing ball. Once the sealing ball is unseated, the open passageway allows fuel vapor to accumulate and if the second predetermined pressure set-point is above the first predetermined pressure set-point, the fuel vapor will activate the valve actuator. Once activated, the valve actuator will move the valve to the venting position allowing the flow of fuel vapor from the fuel tank to the outlet along the vent path.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
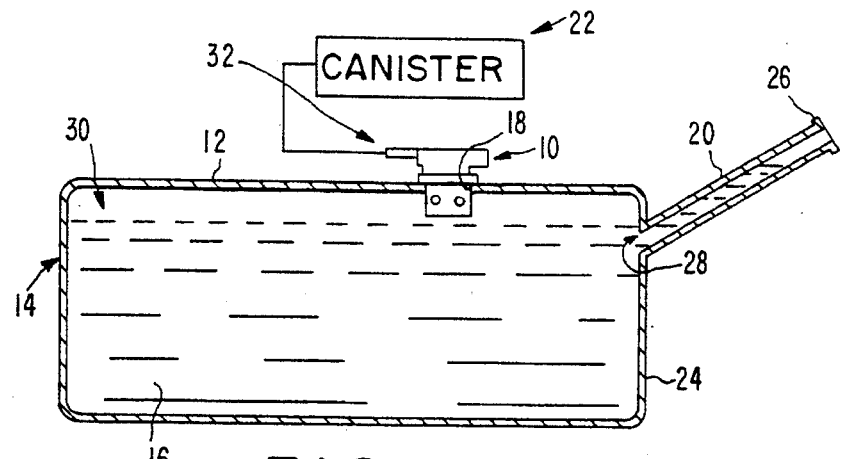
FIG. 1 is a diagrammatic illustration of a fuel vapor control valve in accordance with the present invention mounted in the top wall of a vehicle fuel tank.

An illustration of a fuel vapor control valve 10 in accordance with the present invention is shown in FIG. 1 in one possible application mounted in the top wall 12 of a vehicle fuel tank 14. This fuel vapor control valve 10 functions to vent excess fuel vapor pressure from fuel tank 14 when tank pressure is too high, admit atmospheric air into the fuel tank 14 when tank pressure is too low, and vent some fuel vapor pressure from fuel tank 14 when the vehicle carrying the fuel tank 14 is in motion.

The fuel tank 14 is configured to hold a volatile fuel 16 that is capable of producing fuel vapor. As shown, the fuel vapor control valve 10 is fitted into an aperture 18 formed in the top wall 12 of fuel tank 14. It will be understood that the fuel vapor control valve 10 will normally be connected to an on-board fuel vapor treatment site such as a conventional fuel canister 22 or the like which may be, for example, a charcoal-filled vapor recovery canister, to receive the vented fuel vapor. It will be further understood that the fuel vapor control valve 10 could be positioned at other locations within the fuel system (not shown) other than that illustrated in FIG. 1.

A filler neck 20 is shown extending upwardly and outwardly from a side wall 24 of the fuel tank 14 in FIG. 1. The filler neck 20 includes an outer filler end 26 that is configured to receive fuel supplied by a fuel-dispensing nozzle (not shown). The filler neck 20 further includes an inner end 28 that joins the side wall 24 to provide fluid communication between the filler neck 20 and the fuel tank 14.

In operation, the fuel vapor control valve 10 permits fuel vapor to be vented from a vapor space 30 in fuel tank 14 to the canister 22 through a venting outlet 32 formed in fuel vapor control valve 10 when tank pressure exceeds a predetermined "maximum pressure" level. The vapor space 30 is located in an upper region inside fuel tank 14 above the top surface of liquid fuel 16 in fuel tank 14. It also permits fuel vapor from the canister 22 or ambient air from the atmosphere outside the fuel vapor control valve 10 to enter the fuel tank 14. When the vehicle (not shown) carrying fuel tank 14 is in motion, the fuel vapor control valve 10 permits generally unrestricted venting of fuel vapor from the fuel tank 14 to diminish tank pressure somewhat, even though the tank pressure has not exceeded the predetermined pressure set-point level. In addition, fuel vapor control valve 10 is configured to maintain a preselected pressure, or "pressure head" within the fuel tank 14 only when the vehicle is stationary. This preselected pressure head advantageously aids in preventing overfilling of the fuel tank 14 during the fuel filling operation.

Figure 2:
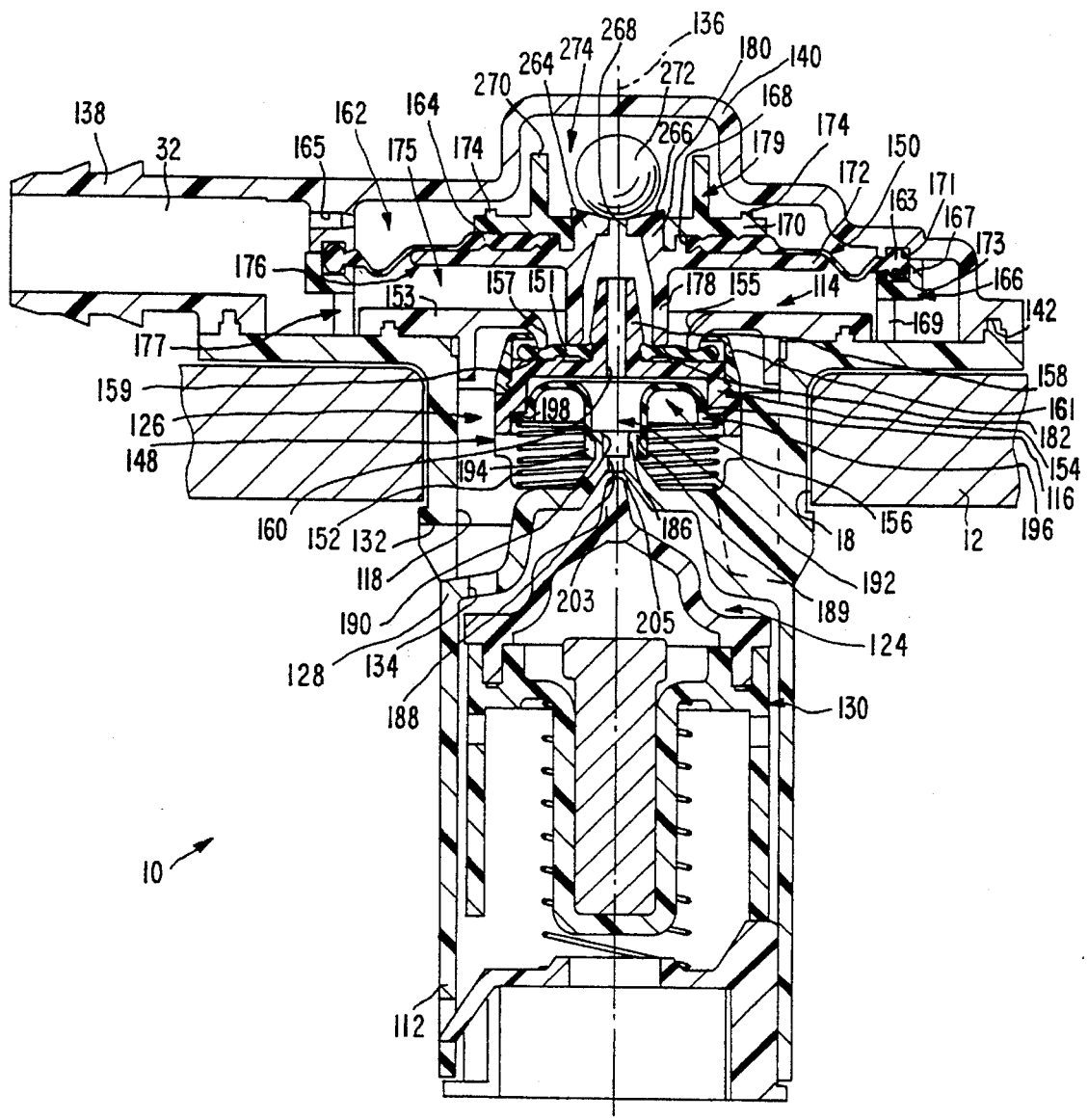
FIG. 2 is a sectional detail view of a first embodiment of the fuel vapor control valve in accordance with the present invention showing a lower chamber containing a roll-over valve, an upper chamber communicating with a side-discharge venting outlet and containing a spring-loaded valve in its blocking position cooperating with an annular seating member to normally close a large aperture formed in the valve housing, a head-valve cage appended to a diaphragm that activates the spring-loaded valve, and a movable ball-type head-valve in the head valve cage.
Figure 3:
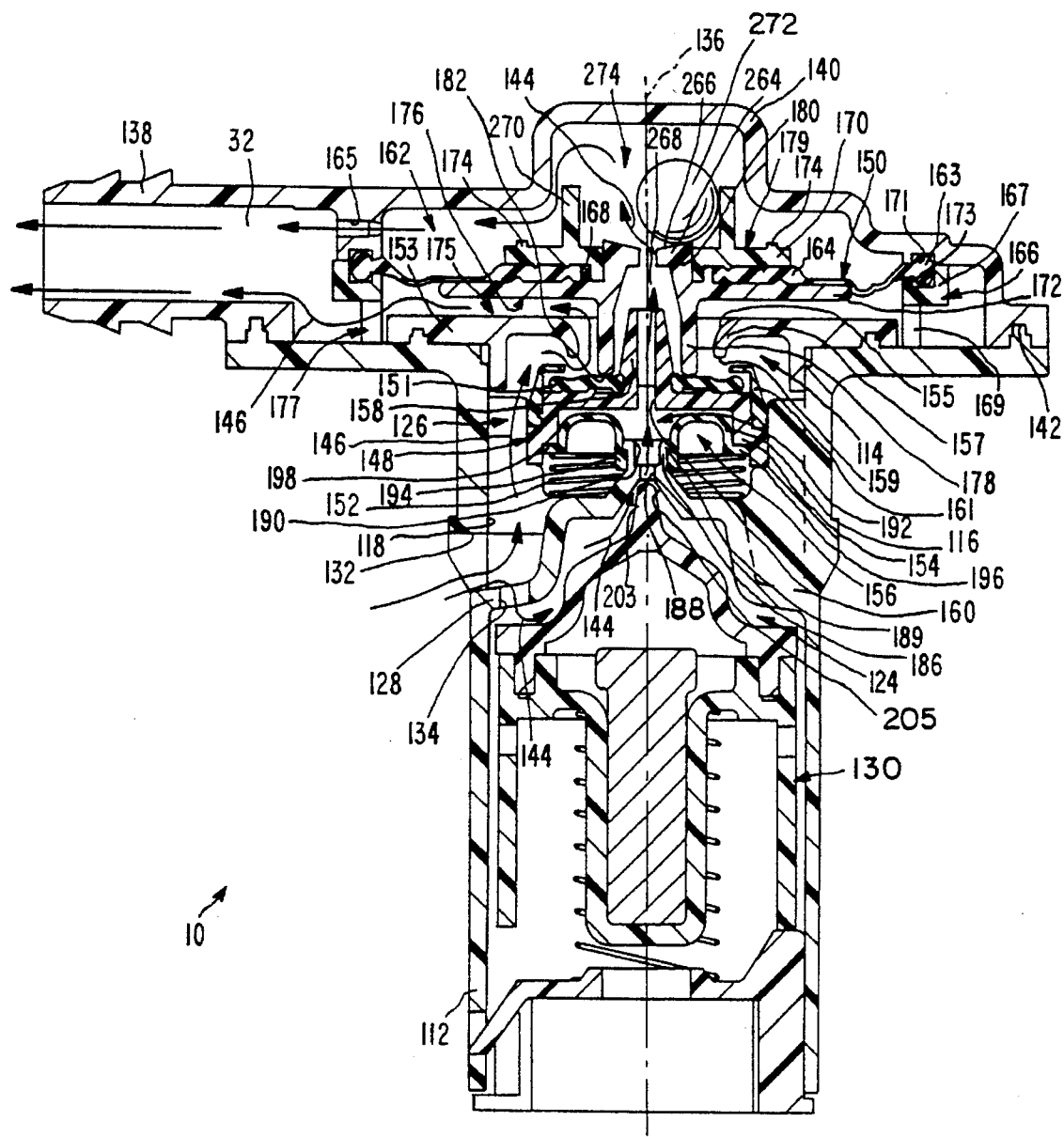
FIG. 3 is a view similar to FIG. 2 showing lateral displacement of the ball-type head valve during vehicle motion resulting in the flow of pressurized fuel vapor from the vehicle fuel tank to a chamber above the diaphragm thereby activating the spring-loaded valve to allow the release of pressurized fuel vapor from the venting outlet.
Figure 4:
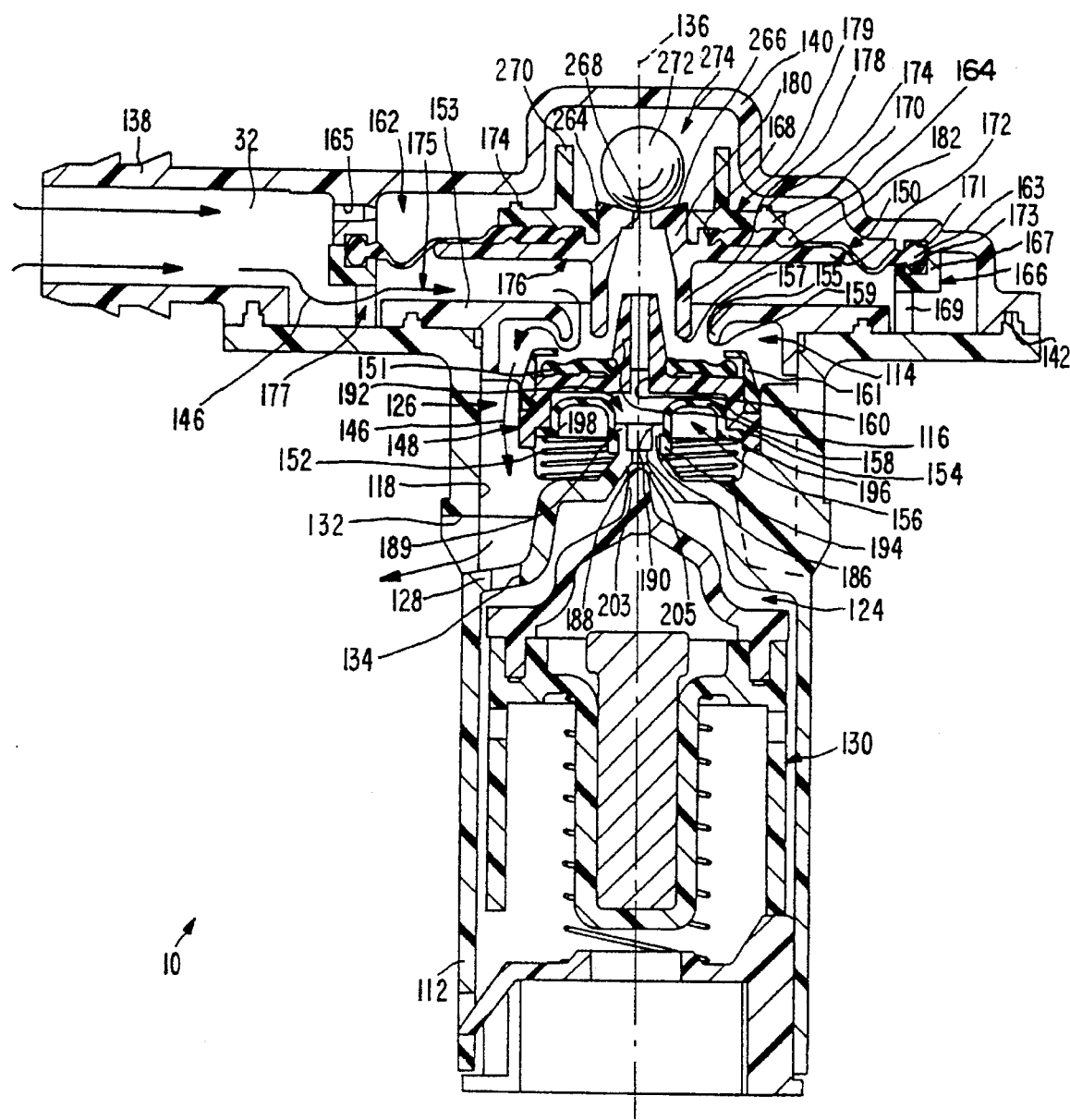
FIG. 4 is a view similar to FIG. 3 showing the spring-loaded valve pulled away from the annular seating member due to subatmospheric pressure in the fuel tank to its venting position allowing the flow of ambient air from the venting outlet into the fuel tank along a vent path.

The fuel vapor control valve 10 in accordance with the present invention is illustrated in detail in FIGS. 2–4. As shown in FIG. 2, fuel vapor control valve 10 is designed to be mounted in an aperture 18 formed in a top wall 12 of a fuel tank 14. Fuel vapor control valve 10 is shown to include a housing 112, a valve assembly 114, and a flexible partition 116 cooperating to provide venting of excess fuel vapor pressure from a fuel tank 14 to an appropriate treatment device.

Housing 112 is formed to include a hollow interior 118 which is divided into a lower chamber 124 and an upper chamber 126 by a flow shield 128. Lower chamber 124 houses a rollover valve assembly 130, while upper chamber 126 houses valve assembly 114 and flexible partition 116.

Housing 112 is formed to include a plurality of inlet openings or windows 132 which allow fuel vapor from the fuel tank 14 to pass into upper chamber 126. Inlet openings 132 are sized to permit relatively large volumes of fuel vapor to pass into upper chamber 126 for eventual venting through upper chamber 126 to canister 22 as will be subsequently described. Flow shield 128 is also formed to include a plurality of relatively small diameter inlet openings 134 which allow a relatively small volume of fuel vapor from the fuel tank 14 to enter lower chamber 124. This relatively small volume of fuel vapor is transported to upper chamber 126 to serve as a pressure signal for activating valve assembly 114 as will be subsequently described.

Housing 112 is also formed to include venting outlet 32 which allows passage of fuel vapor from housing 112 to canister 22. In particular, an outlet tube 138 is formed in a cover 140 of housing 112. Cover 140 includes a groove 142 designed for snap fitting engagement to the housing 112. Housing 112 thus defines a vent path 146 for fuel vapor between the fuel tank 14 and venting outlet 32. As shown in FIG. 3, fuel vapor designated by arrows 146 flows from the fuel tank 14 to outlet 32 along the vent path 146 defined by housing 112.

The flow of fuel vapor along the vent path 146 is controlled by valve assembly 114. Valve assembly 114 includes a valve 148 and a valve actuator 150. Valve 148 is typically of the variety of valves known as "poppet" valves.

Valve 148 is moveable between a blocking position shown in FIG. 2 and a venting position shown in FIGS. 3–4. When in its blocking position, a valve seat 151 appended to valve 148 sealingly engages a partition 153. Partition 153 is preferably an annular insert formed to include an opening 155 and an annular wall 157 surrounding the bottom side of the opening 155. The annular wall 157 terminates in a lower edge 159 that engages valve seat 151 when the valve 148 is in the blocking position. Valve 148, when thus seated, blocks flow of fuel vapor between the fuel tank 14 and outlet 32 along the vent path 146. When moved away from the edge 159 of the partition 153 to its venting position, valve 148 allows flow of fuel vapor between the fuel tank 14 and outlet 32 along the vent path 146. Valve assembly 114 also includes a spring 152 acting between flow shield 128 and valve 148 to bias valve 148 toward its blocking position.

Valve 148 includes an inverted cup 154 defining an interior region 156 and an annular valve guide 161 appended to the sides of the cup 154 and extending upwardly therefrom. The valve guide 161 cooperates with the annular wall 157 of the partition 153 to locate the cup 154 along a central axis 136 of the upper chamber 126.

Valve 148 also includes an upstanding sleeve 158 projecting from the central portion of inverted cup 154. Cup 154 is formed to include an opening 160 linking interior region 156 and the interior of sleeve 158 in fluid communication. Opening 160 serves as an inlet opening for sleeve 158.

Valve actuator 150 is provided to move valve 148 against the biasing force of spring 152 from its blocking position to its venting position when the fuel vapor pressure in the fuel tank 14 exceeds a predetermined level. Fuel vapor from the fuel tank 14 is used to depress valve actuator 150, which in turn urges valve 148 toward its venting position as shown, for example, in FIG. 3.

Valve actuator 150 includes a diaphragm 164 or other suitable resilient sealing material having its peripheral edge 163 mounted between an insert 166 and cover 140. Insert 166 is preferably a ring-shaped support member having an upper circular support portion 167 and a lower wall portion 169. Upper support portion 167 is formed to include a groove 171 sized to receive a peripheral edge 163 of diaphragm 164. Groove 171 aligns with a similar groove 173 formed in cover 140, cooperating therewith to provide a recess for receiving and supporting peripheral edge 163 of diaphragm 164.

Lower wall portion 169 cooperates with the underside of diaphragm 164 to define a chamber 175 beneath diaphragm 164. Lower wall portion 169 is preferably formed to include four equally spaced rectangular openings 177 serving as outlet apertures for chamber 175 for controlled release of fuel vapor from chamber 175. Fuel vapor venting past valve 148 through opening 155 enters chamber 175, where it is momentarily retained until it can pass through rectangular openings 177 to venting outlet 32.

Diaphragm 164 cooperates with cover 140 to define a venting control chamber 162 for receiving and using a fuel vapor signal from lower chamber 124 to apply pressure against diaphragm 164. As shown in FIG. 3, fuel vapor designated by arrows 144 flows from the fuel tank 14 to the venting control chamber 162. Cover 140 is formed to include a bleed passageway 165 to connect venting control chamber 162 in fluid communication with outlet tube 138. Thus, fuel vapor accumulating in venting control chamber 162 eventually dissipates through bleed passageway 165 to outlet tube 138 and then to venting outlet 32.

Diaphragm 164 is movable in response to an accumulation of fuel vapor pressure in venting control chamber 162 between a static position shown in FIGS. 2 and 4 allowing valve 148 to remain in its blocking position seated against valve seat 151, and an actuating position urging valve 148 away from valve seat 151 against the bias of spring 152 toward its venting position shown in FIG. 3. Advantageously, fuel vapor temporarily retained in lower chamber 124 assists in returning diaphragm 164 to its static position when venting from the fuel tank 14 is no longer necessary.

A central opening 168 is formed in diaphragm 164 to provide a portion of a conduit for transmission of a small volume of fuel vapor to venting control chamber 162 to provide the actuation signal to diaphragm 164. As has been noted, the fuel vapor signal must be transported from lower chamber 124 to venting control chamber 162 to perform its function.

A ball-support member 176 having a lower backing plate 172 and a motion-limiting member 179 having an upper backing plate 170 are both appended to diaphragm 164. The pair of rigid plastic backing plates 170 and 172 sandwich diaphragm 164. Upper backing plate 170 includes a pair of spaced apart straight ridges 174. Ridges 174 assist in temporarily capturing fuel vapor in the central portion of venting control chamber 162 to ensure that fuel vapor pressure acts across the central portion of diaphragm 164 instead of dissipating to outer portions of the venting control chamber 162 and escaping to outlet tube 138 by way of a bleed passageway 165 formed between venting control chamber 162 and outlet tube 138.

Lower backing plate 172 is formed to include a depending sleeve 178. An upper portion 180 of sleeve 178 projects through a central opening 168 formed in diaphragm 164. A conical base 264 is appended to the upper portion 180 of sleeve 178 as shown in FIGS. 2–4. The conical base 264 is formed to define an upwardly facing, generally conical ramp portion 266 centered around a central venting aperture 268. An annular upper wall 270 is appended to the upper backing plate 172 and is arranged to surround the conical ramp portion 266 and the central venting aperture 268. A ball-type head valve 272 is positioned for lateral movement within a ball-receiving space 274 defined by conical base 264, the surrounding annular upper wall 270, and the overlying housing cover 140. The sealing ball 272 functions to provide a pressure-relief head valve that moves to open venting aperture 268 in response to vehicle motion.

The sealing ball 272 is sized to rest on the conical ramp portion 266 and to seat in and close the venting aperture 268 when the fuel vapor control valve 10 is in a stationary condition as shown in FIG. 2. The conical ramp portion 266, the sealing ball 272, and the venting conical aperture 268 are sized and shaped to permit the sealing ball 272 to be displaced relatively easily from its normal position closing the venting aperture 268 when the vehicle (not shown) carrying fuel tank 14 and the fuel vapor control valve 10 are disturbed, such as when the vehicle is in motion.

The annular upper wall 270 provides a head valve cage to retain the sealing ball 272 generally in a position above the venting aperture 268 formed in conical base 264. As illustrated in FIGS. 2–4, the annular upper wall 270 has an inner diameter somewhat greater than the outer diameter of the sealing ball 272. The greater inner diameter of the annular wall 270 is provided to permit the sealing ball 272 to move laterally upon the conical ramp portion 266 whenever the vehicle is in motion.

It will be understood that permitting the sealing ball 272 to move laterally upon the conical ramp portion 266 permits the sealing ball 272 to move away from and open the venting aperture 268, thereby allowing the flow of fuel vapor from the lower chamber 124 to the venting control chamber 162. If the tank pressure is above a first predetermined pressure set-point, it will allow an accumulation of fuel vapor pressure in the venting control chamber 162 sufficient to move diaphragm 164 from the static blocking position seated against valve seat 151 to the actuating position urging valve 148 away from valve seat 151 against the bias of spring 152 toward its venting position allowing fuel vapor designated by arrows 146 as shown in FIG. 3 to flow from the fuel tank 14 to the venting outlet 32 along the vent path 146.

If the tank pressure is below the predetermined pressure set-point, fuel vapor designated by arrows 144 as shown in FIG. 3 will flow from the fuel tank 14 to venting control chamber 162, to the bleed passageways 165, and to the venting outlet 32. Thus, this lateral movement, or "rattle" of the sealing ball 272 permits the gradual venting of the fuel tank 14 when the vehicle is in motion.

However, when the vehicle is not in motion, the weight of sealing ball 272 generates a preselected, yieldable sealing force acting on sealing ball 272 to cause sealing ball 272 to seal and close the venting aperture 268. The sealing ball 272 functions to determine the head pressure that develops within the fuel tank 14 during refueling operations. This preselected head pressure within the fuel tank 14 is advantageous during the tank-filling operation of the fuel tank 14 and will be discussed in greater detail below.

Advantageously, sleeve 178 of the lower backing plate 172 cooperates with sleeve 158 of the cup 154 to provide means for slidably coupling valve actuator 150 to valve 148. A lower edge 182 of sleeve 178 sealingly engages the valve seat 151 when the valve 148 is in the blocking position. The lower edge 182 of sleeve 178 also engages valve seat 151 of cup 154 to move valve 148 away from its blocking position when the diaphragm 164 moves in response to an accumulation of fuel vapor pressure in venting control chamber 162 to its actuating position. Thus, valve actuator 150 engages valve 148 to move valve 148 away from its blocking position.

Further advantageously, sleeves 158 and 178 cooperate to provide a "slip joint" enabling valve 148 and valve seat 151 to move away from partition 153 toward its venting position without valve diaphragm 164 moving away from its static position toward its actuating position. This feature allows valve 148 to function as a vacuum-relief valve. That is, when the fuel vapor pressure in the fuel tank 14 is reduced to below a predetermined level, valve 148 and valve seat 151 can move away from the partition 153 without being actuated by valve actuator 150 to restore the fuel tank 14 to approximately atmospheric pressure.

Another advantage of sleeves 158 and 178 is that they cooperate to provide a portion of a conduit for transmission of a small volume of fuel vapor to venting control chamber 162 to provide the actuation signal to diaphragm 164. As has been noted, the fuel vapor signal must be transported from lower chamber 124 to venting control chamber 162 to perform its function.

Fuel vapor control valve 10 is thus provided with a conduit aligned along the central longitudinal axis 136 of housing 112. This "concentric" construction provides numerous advantages. For example, the concentric arrangement allows for a relatively large diameter cup 154 with a small amount of travel between the blocking position and the venting position. This permits quicker response without enlarging the diameter of opening 155.

In addition, the present arrangement, by providing a relatively large volume chamber 175 for venting, allows for reduced fuel vapor velocity through opening 155. This is desirable because at higher fuel vapor velocities, entrained droplets of liquid fuel have a greater tendency to carry over through opening 155 to pass eventually to canister 22, reducing its effectiveness. The present arrangement further allows for the use of a relatively large diameter diaphragm 164 which is highly sensitive to even low levels of tank pressure while at the same time maintaining a relatively small diameter of housing 112. The conduit includes a first portion and a second portion moveable relative to the first portion to define an intermediate portion. A tube 186 provides the first portion of the conduit, while sleeves 158 and 178 cooperate to provide the second portion of the conduit.

Tube 186 projects upward from flow shield 128 along a central axis 136 of housing 112. Tube 186 includes an inlet opening 188 placing tube 186 in fluid communication with fuel vapor in lower chamber 124. Tube 186 terminates in an outlet opening 190. Tube 186 is also provided with a retaining barb 189 to assist in retaining flexible partition 116 in its proper position, preventing flexible partition 116 from binding as cup 154 moves relative to tube 186 during venting.

As shown in FIG. 2, outlet opening 190 is aligned with inlet opening 160 of sleeve 158 and lies in axially spaced apart relationship therewith when valve 148 is in its blocking position, creating an intermediate portion 192 of the conduit. When outlet opening 190 and inlet opening 160 lie spaced apart as shown in FIG. 2, fuel vapor escaping through outlet opening 190 into intermediate portion 192 might of course dissipate in upper chamber 126 rather than entering inlet opening 160 as is desired. In addition, fuel vapor entering upper chamber 126 through inlet openings 132 would be able to pass into intermediate portion 192.

This would have a particularly undesirable impact on the "closing point" of valve 148—i.e., the pressure at which valve 148 will return to its blocking position from its venting position to prevent further venting. If venting fuel vapor were allowed to enter interior region 156 and pass through opening 160 into sleeves 158, 178 to eventually reach venting control chamber 162, such fuel vapor might apply an unwanted actuating force to diaphragm 164. This would delay movement of diaphragm 164 back to its static position, and hence would delay movement of valve 148 back to its blocking position. Flexible partition 116 assists in preventing this problem by providing a barrier preventing fuel vapor venting through upper chamber 126 along the vent path 146 indicated by arrows 146 from entering intermediate portion 192.

Flexible partition 116 is preferably a cylindrical rolling membrane composed of a low durometer liquid resistant elastomer. Flexible partition 116 includes a tubular portion 194 appended to tube 186 and an outer peripheral edge 196 sealingly engaging a cylindrical seat 198 formed on the interior surface of cup 154. Peripheral edge 196 is held against seat 198 in part by the force of spring 152. Intermediate region 192, then, is defined by the inner wall of cup 154 and flexible partition 116.

When flexible partition 116 is exposed to excessive fuel vapor pressure from fuel vapor entering upper chamber 126 through inlet openings 32, flexible partition 116 will flex and may, under extreme conditions, unseat from seat 198, causing undesirable intermixing of fuel vapor in vent path 146 and fuel vapor exiting outlet opening 190 of tube 186. To prevent flexible partition 116 from unseating from seat 198, the bottom surface of cup 154 is kept in close proximity to flexible partition 116 and is arranged to engage flexible partition 116 when flexible partition 116 begins to flex.

Flow shield 128 is arranged to lie in a generally horizontal orientation inside hollow interior 118 as shown in FIGS. 2–4. The inlet opening 188 formed in flow shield 128 interconnects tube 186 and the lower chamber 124 in fluid communication as shown in FIG. 2.

The flow shield 128 provides a downwardly facing conically shaped valve seat 205 adjacent to inlet opening 188 facing toward the underlying rollover valve assembly 130 situated in lower chamber 124. The rollover valve assembly 130 is configured to provide means for regulating or selectively blocking flow of fuel vapor from the fuel tank 14 toward venting outlet 32 through the inlet opening 188.

The rollover valve assembly 130 includes a nipple 203 adapted to seat against the conical valve seat 205 formed on flow shield 128 to prevent the flow of fuel vapor through the inlet opening 118 during tilting of the vehicle fuel tank 14 in excess of a predetermined amount. Changes in vehicle fuel tank attitude in excess of a predetermined amount cause the rollover valve assembly 130 to move in the lower chamber 124 to place the nipple 203 in engagement with the conical valve seat 205, thereby closing inlet opening 188. Fuel vapor and liquid fuel which enters the lower chamber 124 from fuel tank 14 through, e.g., inlet opening 132 is thereby prevented from leaking out of fuel tank 14 through the inlet opening 188. Thus, rollover valve assembly 130 can provide upstream means for regulating flow of fuel vapor to the tube 186.

The particular rollover valve assembly 130 illustrated in FIGS. 2–4 is described in more detail in U.S. Pat. No. 5,028,244 to Szlaga, which description is incorporated by referenced herein. Of course, it will be understood that other types of rollover valves, including float valves, inertial ball-and-ramp type valves, and others, may be used in accordance with the invention to provide suitable rollover closure.

Operation of the illustrated embodiment of the invention with valve 148 in its blocking position is shown in FIG. 2. Spring 152 normally acts to urge valve 148 to its blocking position having valve seat 151 in engagement with both the edge 159 of the partition 153 and the edge 182 of sleeve 178 when fuel vapor pressure in the fuel tank 14 is relatively low. At the same time, the sealing ball 272 closes the venting aperture 268 formed in the conical base 264 of sleeve 178. Thus, no fuel vapor is conducted from the vapor space 30 in the fuel tank 14 to the venting outlet 32 through either the venting control chamber 162 and bleed passageways 165 or along the vent path 146, and no fuel vapor from fuel vapor storage canister 22 or air from the atmosphere is conducted through venting outlet 32 and into the vapor space 30 in the fuel tank 14.

Because the liquid fuel 16 (shown in FIG. 1) is capable of expanding within the fuel tank 14 under certain temperature conditions, and because the liquid fuel 16 is capable of producing fuel vapor, it is desirable to limit the level of the liquid fuel 16 to a level somewhat below the upper wall 12 of the fuel tank 14 in the tank-filling operation to accommodate this expansion of fuel or creation of fuel vapor. This space is illustrated in FIG. 1 as an expansion volume or "vapor space" 30. The amount of the expansion volume 30 is generally dictated by the position of the inner end 28 of the filler neck 20 below the top wall 12 of fuel tank 14. When the liquid fuel level within the fuel tank 14 rises above the inner end 28 of the filler neck 20, the liquid fuel 16 being introduced into the filler neck 20 then rises up the filler neck 20 to provide an indication to either the operator or an automatic shutoff on the fuel-dispensing nozzle (not shown) to shut off the input of liquid fuel into filler neck 20. When this procedure is followed, the desirable expansion volume 30 is created in the upper portion of the fuel tank 14.

When the filler neck 20 is full of liquid fuel, the level of the liquid fuel within the filler neck 20 will be normally higher than the level of the liquid fuel within the fuel tank 14 as shown, for example, in FIG. 1. It will be understood that this higher level of liquid fuel in the filler neck 20 creates a pressure, or "pressure head" that is exerted into the fuel tank 14. This pressure head will vary depending upon the distance that the level of liquid fuel in the filler neck 20 exceeds the level of liquid fuel 16 in the fuel tank 14.

If the fuel vapor control valve 10 permitted generally unrestricted vapor release during this tank-filling operation, it will be understood that the pressure head created by the liquid fuel in the filler neck 20 could cause the expansion volume 30 to decrease. This could occur because the pressure within the expansion volume 30 would be permitted to vent through the fuel vapor control valve 10, which venting would allow the fuel in the filler neck 20 to flow into the fuel tank 14 to cause the level of liquid fuel 16 to rise in the fuel tank 14. As previously discussed, it is desirable to maintain a preselected amount of expansion volume 30 in the fuel tank 14. To prevent the level of liquid fuel 16 from rising in the fuel tank 14 due to the pressure head created by the liquid fuel 16 in the filler neck 20, it is necessary to maintain a pressure head in the fuel tank 14 to overcome the pressure head created in the filler neck 20.

To provide the pressure head in the fuel tank 14 necessary to maintain the desired amount of expansion volume 30, it is necessary to disable the venting capability of the fuel vapor control valve 10 during the tank-filling operation. To disable the fuel vapor control valve 10, the sealing ball 272 is configured to seat in and close the venting aperture 268 formed in conical base 264 when the vehicle is stationary. This permits the sealing ball 272 to close the venting aperture 268 thereby preventing the flow of fuel vapor to the outlet 32 through the venting control chamber 162 while also disabling the valve actuator 150.

The weight of the sealing ball 272 is selected to maintain the proper pressure head within the fuel tank 14 to maintain the desired amount of expansion volume 30 during refueling. Illustratively, if the filler neck 20 extends 10 inches (25.4 cm) above the upper wall 12 of the fuel tank 14, then the sealing ball 272 can be selected to maintain a pressure head of 12 inches (30.5 cm) in the fuel tank 14. This will prevent the pressure head created in the filler neck 20 from reducing the desired amount of expansion volume 30 in the fuel tank 14 during refueling.

After the tank-filling operation is complete, and the proper expansion volume 30 in fuel tank 14 has been created, it is desirable to permit generally unrestricted venting from the fuel tank 14 through the fuel vapor control valve 10. To permit this generally unrestricted venting, the sealing ball 272, the annular upper wall 270, and the conical ramp portion 266 cooperate to permit the sealing ball 272 to rattle and move laterally within the ball-receiving space 274 to open the venting aperture 268 as shown in FIG. 3.

By permitting the sealing ball 272 to move away from the venting aperture 268, the fuel vapor control valve 10 permits fuel vapor to vent from the fuel tank 14 in two manners. First, fuel vapor is permitted to flow into the venting control chamber 162, around the ridges 174 on back plate 170, through the bleed passageways 165, and to the venting outlet 32. Second, if the fuel vapor pressure is higher than the first predetermined pressure set-point, sufficient fuel vapor will accumulate in the venting control chamber 162 to move the diaphragm 164 to its actuating position, thereby actuating the valve 148 and allowing fuel vapor to flow along the vent path 146.

Thus, as long as the vehicle (not shown) is in motion, the sealing ball 272 is generally located on the conical ramp portion but in a position opening the venting aperture 268. Upon lateral acceleration of the fuel vapor control valve 10 caused by vehicle motion, the ball-type head valve 272 will be moved away from venting aperture 268, thereby allowing open flow of fuel vapor through venting aperture 268 and diminishing tank pressure below the first predetermined pressure set-point. This venting helps to eliminate any unwanted residual tank pressure extant in the fuel tank 14 during vehicle motion.

At relatively low tank pressures with float valve 202 moved away from inlet opening 188, a small volume of fuel vapor can pass through the conduit formed by tube 186 and sleeves 158, 178 to reach venting control chamber 162 to serve as a pressure signal for diaphragm 164. Specifically, fuel vapor in lower chamber 124 can pass through inlet opening 188 to tube 186, exiting at outlet opening 190. When valve 148 is in its blocking position, tube 186 is axially spaced apart from sleeve 158. That is, the first portion of the conduit is spaced apart from the second portion of the conduit to define intermediate portion 192. Fuel vapor exiting tube 186 at outlet opening 190 passes into intermediate portion 192.

However, with flexible partition 116 in place, fuel vapor in intermediate portion 192 is prevented from dissipating and intermixing with fuel vapor entering upper chamber 126 through inlet opening 132. Instead, fuel vapor is retained in intermediate portion 192 for passage through opening 160 to the passageway defined by sleeve 158. Likewise, fuel vapor entering upper chamber 126 to vent along vent path 146 is prevented from entering intermediate portion 192.

The fuel vapor then passes through sleeve 158 directly to sleeve 178, which is positioned in a sealing relationship with valve seat 151. Finally, the fuel vapor exits sleeve 178 to venting control chamber 162, accumulating first in the central portion thereof due to the presence of ridges 174.

However, at low tank pressures, the fuel vapor accumulating in venting control chamber 162 does not supply sufficient force to diaphragm 164 to move diaphragm 164 away from its static position as shown in FIG. 2. Valve 148 thus remains in its blocking position preventing flow of fuel vapor through upper chamber 126 along vent path 146. As shown in FIG. 3, at higher tank pressures, the fuel vapor pressure signal in venting control chamber 162 can apply sufficient force to diaphragm 164 to move diaphragm 164 to its actuating position, in turn moving valve 148 from its blocking position to its venting position.

It will be understood that should the vehicle (not shown) remain stationary for a lengthy period of time after filling, the pressure in the fuel tank 14 could increase due to changes in fuel temperature. If the pressure in the fuel tank 14 exceeds a second predetermined pressure set-point, the sealing ball 272 will be forced away from sealing engagement with the venting aperture 268 and fuel vapor will accumulate in the venting control chamber 162.

Once sufficient fuel vapor accumulates in the venting control chamber 162 to overcome the force of spring 152 that is urging the cup 154 into the upward blocking position, the diaphragm 164 will move downwardly to its actuating position. Lower back plate 172, appended to the diaphragm 164, and the lower edge 182 of the depending sleeve 178 on lower back plate 172 which is in engagement with the valve seat 151 on the cup 154 of the valve 148 will force the cup 154 downwardly. The valve seat 151 will disengage from the edge 159 of the partition 153 thereby permitting the flow of fuel vapor from the fuel tank 14 to the outlet 32 along the vent path 146, as shown in FIG. 3. It will be apparent to those skilled in the art that by varying the material of the sealing ball 272 or by varying the physical dimensions of the sealing ball 272 and the conical ramp portion 266, one may vary the second predetermined pressure set-point allowed in fuel tank 14 of the stationary vehicle.

Since peripheral edge 196 of flexible partition 116 is seated against seat 198 of cup 154, edge 196 is urged to move along with cup 154. However, tubular portion 194 of flexible partition 116 is seated against tube 186, which is fixed against movement. Advantageously, flexible partition 116 is designed to flex or roll to maintain the barrier separating fuel vapor in intermediate portion 192 from fuel vapor entering upper chamber 126 through inlet opening 132.

Once valve 148 and valve seat 151 have been urged away from partition 153, fuel vapor can flow along vent path 146 through housing 112 to venting outlet 32, and thence to vapor recovery canister 22 as shown. Valve 148 will remain in this venting position until the fuel vapor pressure in the fuel tank 14 is reduced to acceptable levels.

As the fuel vapor pressure in the fuel tank 14 is reduced through venting, the pressure in venting control chamber 162 is of course also reduced. The force applied by fuel vapor in venting control chamber 162 diminishes to the point at which it becomes insufficient to maintain diaphragm 164 in the actuating position. Diaphragm 164 thus begins to return to its static position shown in FIG. 2. Fuel vapor remaining in venting control chamber 162 is forced out through bleed passageway 165 to outlet tube 138, eventually exiting through venting outlet 32.

In addition, as valve 148 moves back toward valve seat 151, flexible partition 116 flexes to return to its position as shown in FIG. 2. Thus, flexible partition 116 continues to maintain the barrier between fuel vapor in intermediate portion 192 and fuel vapor entering upper chamber 126 though inlet opening 132.

It will also be understood that a vehicle (not shown) in motion could experience high-pressure levels of the fuel vapor in the fuel tank 14. When the vehicle is in motion, the sealing ball 272, the annular upper wall 270, and the conical ramp portion 266 cooperate to permit the sealing ball 272 to react to lateral accelerations present in the fuel vapor control valve 10 by rattling and moving laterally within the ball-receiving space 274 to open the venting aperture 268 as shown in FIG. 3.

If the pressure in the fuel tank 14 exceeds the first predetermined pressure set-point while the vehicle is in motion, fuel vapor will accumulate in the venting control chamber 162 and will quickly overcome the force of spring 152 urging the cup 154 into the upward blocking position. The diaphragm 164 will move downwardly to its actuating position and the depending sleeve 178 on lower back plate 172 will force the valve seat 151 of the cup 154 downwardly. The valve seat 151 will disengage from the edge 159 of the partition 153 thereby permitting the flow of fuel vapor from the fuel tank 14 to the outlet 32 along the vent path 146, as shown in FIG. 3. It will be apparent to those skilled in the art that by varying the material of the spring 152, the physical dimensions of the spring 152, or in some other way altering the spring constant of the spring 152, one may vary the first predetermined pressure set-point allowed in fuel tank 14 of the vehicle when the vehicle is in motion.

Operation of fuel vapor control valve 10 during tank vacuum conditions is illustrated in FIG. 4. When the fuel vapor pressure in the fuel tank 14 is reduced to below a predetermined minimum pressure, it is desirable to provide vacuum relief by reverse the flow of air at atmospheric pressure along vent path 146 from outlet 32 to inlets 132 and thence to the fuel tank 14. To effect such reverse flow along vent path 146, valve 148 must of course be moved away from its blocking position toward its venting position. Under high tank pressure conditions, this would be accomplished by pressure buildup in venting control chamber 162 to move diaphragm 164 to actuate valve 148.

Under tank vacuum conditions, however, the pressure in venting control chamber 162 will obviously be insufficient to move diaphragm 164 from its static to its actuating position. However, the pressure differential across valve 148 will be sufficient to move valve 148 away from its blocking position. The pressure in outlet tube 138, and hence on the outer portion of cup 154, will be approximately atmospheric, while the pressure beneath cup 154 (the pressure in the fuel tank 14) will be lower than atmospheric.

Advantageously, valve 148 is capable of decoupling from valve actuator 150 to react to this pressure differential. As valve 148 is urged away from valve seat 151 toward its venting position, sleeve 158 slides relative to sleeve 178 as shown in FIG. 4. Thus, valve 148 is moved to its venting position while diaphragm 164 remains in its static position.

Ambient air can then flow in reverse along vent path 146 to reach the fuel tank 14, relieving the tank vacuum conditions. As the pressure in the fuel tank 14 returns to approximately atmospheric pressure, spring 152 biases valve 148 back to its blocking position seated against valve seat 151. Again, it will be apparent to those skilled in the art that by varying the material of the spring 152, the physical dimensions of the spring 152, or in some other way altering the spring constant of the spring 152, one may vary the predetermined minimum pressure allowed in the fuel tank 14.

In addition, under tank vacuum conditions when the vehicle is in motion, the sealing ball 272 can move away from the venting aperture 268 to permit ambient air or fuel vapor from canister 22 to flow from the venting outlet 32, through the bleed passageways 165, into the venting control chamber 162, and to the fuel tank 14. This venting helps to eliminate any unwanted residual tank vacuum in the fuel tank 14 during vehicle motion.

Advantageously, the ball sitting in the conic ramp seals the signal orifice. The ball diameter and ramp angle are configured such that a static opening pressure is established. An added degree of sensitivity is achieved when the valve is in motion, unseating the ball to allow the signal orifice to open. Also, a structure is in place to retain the ball in the position of operation.

Additionally, use of the motion-actuated fuel vapor control valve 10 of the present invention to regulate fluid vapor pressure inside of a vessel provides variable results depending upon the status of the vessel. At a static condition, the valve will not allow fluid vapor flow until the second predetermined pressure set-point is reached. When the valve and vessel are accelerated horizontally, a small volume of fluid vapor will flow with any pressure differential. A high volume of fluid vapor will flow when the valve and vessel are accelerated horizontally and the first predetermined pressure set-point is reached.

The valve in accordance with the present invention allows a controlled fuel fill level in a valve without an externally connected signal. The valve allows a head pressure to be built to create a fill nozzle shut-off, which is ventilated during vehicle operation eliminating the residual tank pressure and the resulting "puff" loss or expulsion when the cap is removed.

The valve combines into one unit what presently requires separate diaphragm-type control valves presently in use in conjunction with tank-mounted vent valves. These separate units require hose routings and additional hardware.

Although the invention has been described in detail with reference to preferred embodiments, additional variations and modifications exist within the scope and spirit of the invention as described and defined in the following claims.

I claim:

1. A fuel vapor control valve for controlling the flow of fuel vapor and liquid fuel through an aperture in a fuel tank, the fuel vapor control valve comprising a housing mounted in the aperture and formed to include an inlet in fluid communication with the fuel tank and an outlet, a valve movable in the housing between a blocking position blocking flow of fuel vapor between the inlet and the outlet and a venting position allowing flow of fuel vapor between the inlet and the outlet, means for biasing the valve toward its blocking position, means for using fuel vapor from the fuel tank to move the valve toward its venting position, the using means including a venting control chamber and a conduit communicating fuel vapor from the fuel tank to the venting control chamber, and a ball movably positioned in the venting control chamber to selectively interrupt the fluid communication through the conduit.

2. The fuel vapor control valve of claim 1, wherein the using means includes a diaphragm having an edge arranged to define an aperture arranged to be in fluid communication with both the outlet and the inlet.

3. The fuel vapor control valve of claim 2, wherein the ball sealingly engages the edge of the diaphragm when the ball interrupts the fluid communication between the inlet and the outlet.

4. The fuel vapor control valve of claim 3, wherein the ball has a predetermined weight sufficient to interrupt the flow of fuel vapor through the aperture of the diaphragm so long as the vehicle remains substantially stationary and the tank pressure does not exceed a predetermined maximum pressure.

5. The fuel vapor control valve of claim 1, wherein an annular wall is appended to the using means and is arranged to define a ball-receiving space.

6. The fuel vapor control valve of claim 1, wherein the using means includes a conical base supporting the ball.

7. The fuel vapor control valve of claim 6, wherein the conical base includes an edge defining an aperture in fluid communication with the conduit.

8. The fuel vapor control valve of claim 7, wherein the ball sealingly engages the edge when the ball is at rest on the conical base.

9. The fuel vapor control valve of claim 6, wherein the conical base and the ball move with the valve when the ball is at rest in the conical base and the valve moves from the venting position to the blocking position.

10. The fuel vapor control valve of claim 1, further comprising an upstanding annular wall appended to the using means and extending upwardly therefrom to define a ball-receiving space and the ball is received in the ball-receiving space.

11. The fuel vapor control valve of claim 10, wherein the using means includes a conical base supporting the ball and a plate surrounding the conical base and the upstanding annular wall is appended to the plate to surround the conical base and the ball seated on the conical base.

12. The fuel vapor control valve of claim 11, wherein the venting control chamber has a central portion and an outer portion formed to include a bleed passageway in fluid communication with the venting control chamber and the outlet and further comprising means appended to the plate for temporarily capturing fuel vapor in the central portion to ensure that fuel vapor acts across the using means instead of dissipating to the outer portion of the venting control chamber and escaping through the bleed passageway.

13. The fuel vapor control valve of claim 10, wherein using means is formed to include an aperture communicating fuel vapor from the inlet, through the conduit, to the venting control chamber and the upstanding annular wall is positioned to surround the aperture to place the ball-receiving space in communication with the aperture.

14. The fuel vapor control valve of claim 13, wherein the using means includes a conical base formed to define the aperture, the conical base includes an upwardly facing, generally conical ramp portion supporting the ball when the ball is at rest on the conical base, and the annular wall surrounds the generally conical ramp portion of the conical base.

15. The fuel vapor control valve of claim 1, wherein the using means includes a diaphragm, an upper wall connecting to the housing and cooperating with the diaphragm to define the venting control chamber therebetween, a bleed passageway connecting the venting control chamber and the outlet in fluid communication, and means for accumulating fuel vapor above the diaphragm in the venting control chamber to ensure that fuel vapor pressure acts across the diaphragm instead of escaping through the bleed passageway and the outlet.

16. The fuel vapor control valve of claim 15, wherein the accumulating means includes straight ridges appended to the diaphragm and arranged to extend toward the upper wall.

17. The fuel vapor control valve of claim 15, wherein the upper wall includes a flat portion arranged to lie in spaced-apart relation to the diaphragm and formed to include a central aperture and a domed portion appended to the flat portion to cover the central aperture and the accumulating means is appended to the diaphragm and arranged to lie under and project toward the flat portion of the upper wall to accumulate fuel vapor above the diaphragm and in the domed portion.

18. An apparatus for controlling venting of fuel vapor through an aperture in a fuel tank, the apparatus comprising
a housing mounted in the aperture and formed to include an outlet, the housing defining a vent path for fuel vapor between the fuel tank and the outlet,
a valve movable in the housing between a blocking position blocking flow of fuel vapor between the fuel tank and the outlet along the vent path and a venting position allowing flow of fuel vapor between the fuel tank and the outlet along the vent path,
a spring biasing the valve toward its blocking position,
means for using fuel vapor from the fuel tank to move the valve against the spring toward its venting position, the using means including a venting control chamber receiving fuel vapor from the fuel tank and a conduit communicating fuel vapor from the fuel tank to the venting control chamber, the conduit having a first portion and a second portion movable relative to the first portion to define an intermediate portion,
a flexible partition extending between the valve and the first portion to provide a barrier to prevent fuel vapor venting through the vent path from entering the intermediate portion, the flexible partition being deformable to maintain the barrier when the valve moves away from its blocking position toward its venting position, and
a ball movably positioned in the venting control chamber to selectively interrupt the flow of fuel vapor through the conduit.

19. The apparatus of claim 18, wherein the using means includes a valve actuator for using fuel vapor from the fuel tank to urge the valve toward its venting position, the valve actuator including a diaphragm covering the venting control chamber, the diaphragm having an edge arranged to define an aperture and the conduit includes a stem appended to the edge of the diaphragm and arranged to define a flow channel so that the venting control chamber is in fluid communication with the conduit through the aperture.

20. The apparatus of claim 19, wherein the ball sealingly engages the edge of the diaphragm when the ball interrupts the flow of fuel vapor through the conduit.

21. The apparatus of claim 20, wherein the ball has a predetermined weight sufficient to interrupt the flow of fuel vapor through the aperture of the diaphragm so long as the vehicle remains substantially stationary and the tank pressure does not exceed a predetermined maximum pressure.

22. The apparatus of claim 18, wherein an annular wall is appended to the using means and is arranged to define a ball-receiving space.

23. A fuel vapor control valve for controlling the flow of fuel vapor and liquid fuel through an aperture in a fuel tank, the fuel vapor control valve comprising
a housing mounted in the aperture and formed to include an inlet in fluid communication with the fuel tank and an outlet,
a valve movable in the housing between a blocking position blocking flow of fuel vapor between the fuel tank and the outlet and a venting position allowing flow of fuel vapor between the fuel tank and the outlet,
a diaphragm movable in the housing between an actuating position urging the valve to its venting position and a static position leaving the valve in its blocking position, the diaphragm and a portion of the housing cooperating to define a venting control chamber, the diaphragm formed to include an aperture communicating with an interior region of the venting control chamber, a ball-support member having a portion positioned to lie under the diaphragm and outside of the venting control chamber, the ball-support member including a sleeve having a first end extending through the aperture formed in the diaphragm and a second end under the diaphragm contacting the valve and moving the valve to the venting position in response to movement of the diaphragm to the actuating position, the first end being formed to include a ball-receiving base positioned to lie above the diaphragm in the venting control chamber and an aperture in the ball-receiving base for communicating fuel vapor from the fuel tank to the venting control chamber through the sleeve, and a ball movably positioned on the ball-receiving base to selectively interrupt the flow of fuel vapor from the fuel tank to the venting control chamber through the aperture formed in the ball-receiving base.

24. The fuel vapor control valve of claim 23, wherein the sleeve is formed to include a flow passageway extending from the first end to the second end and communicating with the aperture formed in the second end.

25. The fuel vapor control valve of claim 24, wherein the diameter of the aperture formed in the first end is smaller than the diameter of the aperture formed in the second end.

26. The fuel vapor control valve of claim 23, further comprising a motion-limiting member positioned to lie in the venting control chamber above the diaphragm, the sleeve including a longitudinal axis extending between the first and second ends, and the motion-limiting member including a backing plate formed to include an aperture arranged to receive the sleeve of the ball-support member and an upstanding annular wall surrounding the ball seated on the ball-receiving base for limiting lateral movement of the ball in the venting control chamber relative to the longitudinal axis of the sleeve.

27. The fuel vapor control valve of claim 26, wherein the ball-support member includes a lower backing plate appended to the sleeve and positioned to lie in spaced-apart relation to the backing plate of the motion-limiting member to trap the diaphragm therebetween.

28. A fuel vapor control valve for controlling the flow of fuel vapor and liquid fuel through an aperture in a fuel tank, the fuel vapor control valve comprising a housing mounted in the aperture and formed to include an inlet in fluid communication with the fuel tank and an outlet, a valve movable in the housing between a blocking position blocking flow of fuel vapor between the fuel tank and the outlet a venting position allowing flow of fuel vapor between the fuel tank and the outlet, a valve actuating assembly including a diaphragm movable in the housing between an actuating position urging the valve to its venting position and a static position leaving the valve in its blocking position, the diaphragm and a portion of the housing cooperating to define a venting control chamber, the diaphragm being formed to include a diaphragm aperture communicating with an interior region of the venting control chamber, a motion-limiting member positioned to lie in the venting control chamber above the diaphragm, the motion-limiting member including a backing plate formed to include an aperture and an upstanding annular wall surrounding the diaphragm aperture, the backing plate, upstanding annular wall, and housing cooperating to define a ball-receiving space in the venting control chamber, and a ball movably positioned in the ball-receiving space to selectively interrupt the flow of fuel vapor from the fuel tank to the venting control chamber through the diaphragm aperture.

29. The fuel vapor control valve of claim 28, wherein the valve-actuating assembly further includes a ball-support member positioned to lie under the diaphragm and outside of the venting control chamber, the ball-support member includes a sleeve extending through the diaphragm aperture, the sleeve is formed to include a ball-receiving base positioned to lie in the venting control chamber and an aperture in the ball-receiving base for communicating fuel vapor from the fuel tank to the venting control chamber through the sleeve, and the ball-receiving base is positioned to lie under the ball in the ball-receiving space.

30. A fuel vapor control valve for controlling the flow of fuel vapor and liquid fuel through an aperture in a fuel tank, the fuel vapor control valve comprising a housing mounted in the aperture and formed to include an inlet in fluid communication with the fuel tank, an outlet, and a conduit therebetween in fluid communication with both of the inlet and the outlet, a valve movable in the housing between a blocking position blocking the flow of fuel vapor between the inlet and the outlet and a venting position allowing the flow of fuel vapor between the inlet and the outlet, a valve actuator mounted in the housing and movable in response to fuel vapor pressure from the fuel tank between a static position allowing the valve to occupy its blocking position and an actuating position urging the valve towards its venting position, the valve actuator being formed to include an opening defining a portion of the conduit, and a ball movably positioned in the conduit adjacent to the valve actuator to selectively interrupt the fluid communication through the opening formed in the valve actuator, the ball being movable to restore fluid communication through the opening when pressure in the fuel tank exceeds a predetermined maximum pressure so that pressurized fuel vapor passes through the opening and moves the valve actuator to the actuating position to move the valve to the venting position.

31. The fuel vapor control valve of claim 30, wherein the ball is positioned to lie above the valve actuator and the valve actuator is formed to include a conical base defining the opening and having an annular ramp surrounding the opening so that gravity urges the ball onto the annular ramp to block the opening.

32. The fuel vapor control valve of claim 31, wherein the conical base is surrounded by an upstanding annular wall cooperating with the upper wall to define a ball-receiving space.

33. The fuel vapor control valve of claim 32, wherein the ball, the conical base, and the upstanding annular wall move relative to the housing as the valve actuator moves from the actuating position to the static position.

34. The fuel vapor control valve of claim 30, wherein the valve actuator includes a downwardly extending annular wall surrounding the opening and engaging the valve when the valve actuator is in the actuating position.

35. The fuel vapor control valve of claim 34, wherein the housing includes a downwardly extending annular wall engaging the valve and the valve includes a sealing surface sealingly engaging both of the downwardly extending wall of the valve actuator and of the housing when the valve actuator is in the static position.

36. The fuel vapor control valve of claim 34, wherein the valve includes an upwardly extending sleeve having an opening therethrough in fluid communication with the conduit and the opening in the valve actuator and the sleeve cooperates with the downwardly extending wall of the valve actuator to define a portion of the conduit.

37. The fuel vapor control valve of claim 30, further comprising a spring received in the conduit and yieldably biasing the valve toward the valve actuator.

38. The fuel vapor control valve of claim 37, wherein the spring is arranged to position the valve between the spring and the valve actuator.

39. A flow control assembly for use in controlling the flow of fuel vapor in a vehicle fuel system, the flow control assembly comprising a housing mounted in the vehicle fuel system and formed to include an inlet in fluid communication with the fuel tank and an outlet in fluid communication with the inlet, a valve movable in the housing between a blocking position blocking the flow of fuel vapor between the inlet and the outlet and a venting position allowing flow of fuel vapor between the inlet and the outlet, a ball received in the housing, and an actuator movable in the housing between a static position and an actuating position to move the valve between the blocking position and the venting position when the actuator moves between the static position and the actuating position, the actuator being formed to include tube means for conducting fuel vapor from the inlet toward the outlet, the tube means including a valve-engaging portion at one end thereof and a ball-supporting portion at an opposite end thereof, the ball-supporting portion supporting the ball for movement to selectively interrupt the flow of fuel vapor from the inlet through the tube means, the ball being movable to restore the flow of fuel vapor from the inlet through the tube means when pressure in the fuel tank exceeds a predetermined maximum pressure so that pressurized fuel from the fuel tank moves the tube means to the actuating position.

40. The flow control assembly of claim 39, wherein the actuator includes a diaphragm anchored to the housing, the diaphragm being movable to move the valve-engaging portion of the tube means so that the tube means moves the valve between the blocking position and the venting position.

41. The flow control assembly of claim 40, wherein the ball-supporting portion of the tube means includes a conical base being positioned to lie above the diaphragm, and the tube means further includes a sleeve appended to the conical base and extending downwardly therefrom through the diaphragm to the valve-engaging portion.

42. The flow control assembly of claim 40, wherein the actuator further includes an upstanding annular wall surrounding the ball-supporting portion and extending upwardly from the diaphragm, the annular wall cooperating with the base to define a ball-receiving space receiving the ball.

43. The fuel vapor control valve of claim 39, wherein the actuator includes a diaphragm appended to the tube means and the housing includes an upper wall cooperating with the diaphragm to define a venting control chamber therebetween, and a bleed passageway connecting the venting control chamber and the outlet in fluid communication, and the upper wall includes a domed portion defining a central portion of the venting control chamber positioned to lie above a central portion of the diaphragm, and the actuator further includes means for accumulating fuel vapor above the diaphragm in the central portion of the venting control chamber to ensure that fuel vapor pressure acts across the central portion of the diaphragm instead of escaping through the bleed passageway and the outlet.

44. The fuel vapor control valve of claim 43, wherein the accumulating means includes straight ridges appended to the diaphragm.

* * * * *